United States Patent
Wolters et al.

(10) Patent No.: US 6,719,627 B2
(45) Date of Patent: Apr. 13, 2004

(54) MULTI-POSITION LINKAGE AND LOCKING MECHANISM FOR A CROP RESIDUE SPREADER AND/OR CHOPPER

(75) Inventors: Joshua J. Wolters, Geneseo, IL (US); Jason M Benes, Grand Island, NE (US)

(73) Assignee: Case Corporation, Racine, WI (US)

( * ) Notice: Subject to any disclaimer, the term of this patent is extended or adjusted under 35 U.S.C. 154(b) by 0 days.

(21) Appl. No.: 10/026,455

(22) Filed: Dec. 17, 2001

(65) Prior Publication Data

US 2003/0114207 A1 Jun. 19, 2003

(51) Int. Cl.$^7$ ................................................ A01F 12/40
(52) U.S. Cl. ............................................. 460/111; 460/79
(58) Field of Search ................................ 460/111, 112, 460/901, 79, 78, 119

(56) References Cited

U.S. PATENT DOCUMENTS

| | | | |
|---|---|---|---|
| 3,712,309 A | 1/1973 | Schmitz | 130/27 R |
| 4,669,489 A | 6/1987 | Schraeder et al. | 130/27 R |
| 5,021,028 A | 6/1991 | Kersting et al. | 460/85 |
| 5,501,635 A | 3/1996 | Niermann | 460/112 |
| 5,769,711 A | 6/1998 | Roberg | 460/73 |
| 5,797,793 A | 8/1998 | Matousek et al. | 460/111 |
| 5,813,613 A | 9/1998 | Keenan et al. | 239/676 |
| 5,833,533 A | 11/1998 | Roberg | 460/112 |
| 5,944,604 A | 8/1999 | Niermann et al. | 460/112 |
| 5,974,776 A | 11/1999 | Prellwitz | 56/504 |
| 6,238,286 B1 | 5/2001 | Aubry et al. | 460/111 |
| 6,251,009 B1 | 6/2001 | Grywacheski et al. | 460/112 |
| 6,416,405 B1 * | 7/2002 | Niermann | 460/79 |

FOREIGN PATENT DOCUMENTS

| | | | | |
|---|---|---|---|---|
| DE | 10130652 A1 | * | 1/2003 | A01D/41/12 |
| EP | 0212337 | | 3/1987 | |
| EP | 0357090 A2 | * | 3/1990 | A01F/12/40 |
| WO | WO 01/01754 A1 | * | 1/2001 | A01D/41/12 |

* cited by examiner

Primary Examiner—Robert E. Pezzuto
Assistant Examiner—Meredith Petravick
(74) Attorney, Agent, or Firm—John William Stader; Rebecca L. Henkel

(57) ABSTRACT

A crop residue spreader for an agricultural harvesting machine, including a housing at least partially containing a rotor rotatable about an rotational axis, the housing including at least one inlet opening for receiving a flow of crop residue from the harvesting machine and a discharge opening through which the flow will be propelled by the rotor when rotated, and a linkage arrangement movably connecting the housing containing the rotor to the agricultural machine for allowing the housing and rotor to be moved between at least one position in relation to the harvesting machine for receiving a flow of crop residue from a threshing mechanism of the machine and a flow of crop residue from a cleaning mechanism of the machine through the at least one inlet opening, at least one position for receiving a flow of crop residue from the cleaning mechanism of the harvesting machine through the at least one inlet opening while preventing a flow of crop residue from the threshing mechanism from entering the at least one inlet opening, and at least one position spaced from the cleaning mechanism to allow an operator access thereto through the space. Additionally, a convenient and easy to use locking mechanism which allows the spreader to be securely locked in any of the positions thereof.

15 Claims, 6 Drawing Sheets

MULTI-POSITION LINKAGE AND LOCKING MECHANISM FOR A CROP RESIDUE SPREADER AND/OR CHOPPER

TECHNICAL FIELD

This invention relates generally to agricultural harvesting machines, and more particularly, to a linkage arrangement or mechanism allowing moving a crop residue spreader and/or chopper between multiple operating and service positions.

BACKGROUND ART

Currently, combines and some other harvesting machines typically include a straw chopper and/or straw spreader for disposing of straw separated from the harvested crop by the threshing mechanism onto the crop field. In addition, some combines have a chaff spreader for spreading the chaff separated from the grain by the cleaning apparatus or system. In some combines, the straw and chaff spreading functions are performed by a single spreader. Reference, Matousek et al. U.S. Pat. No. 5,797,793, issued Aug. 25, 1998 to Case Corporation; and Aubry et al. U.S. Pat. No. 6,238,286, issued May 29, 2001 to Deere & Company, which patents disclose vertical and horizontal crop residue spreaders, respectively, operable for performing assorted of the above described spreading functions.

From time to time, a combine's threshing mechanism which separates the grain from straw and stalks, and the cleaning system which separates the grain from pods and husks, require cleaning, adjustment, and/or maintenance which requires access thereto. The presence of crop residue spreaders and/or choppers at the rear or other discharge region of a combine where access to aspects of the threshing and cleaning systems is typically obtained, can make such access difficult and/or time-consuming. In some instances, access even requires removing the residue spreading and/or chopper. Furthermore, during operation, at some times it is desired to place the straw separated from the crop in a windrow directly behind the combine. This is typically done so that the straw can be collected and used, instead of spread out over the field to decompose. However, often when it is desired to windrow the straw, it is also desirable to still spread the chaff over the field. This is not easily possible to do with some residue spreaders.

Thus, what is sought is an improved crop residue spreader and/or chopper positionable in at least one operational position wherein straw, stalks and chaff are spread and/or chopped; at least one position wherein straw is windrowed while chaff is spread; and at least one service position wherein easy and convenient access to the threshing and cleaning apparatus of the combine is provided, the spreader and/or chopper being easily movable between, and lockable in, the respective positions.

SUMMARY OF THE INVENTION

According to the invention crop residue spreader for an agricultural harvesting machine, which provides many of the above described features, is disclosed. The spreader includes a housing at least partially containing a rotor rotatable about an rotational axis, the housing including at least one inlet opening for receiving a flow of crop residue from the harvesting machine and a discharge opening through which the flow will be propelled by the rotor when rotated. The spreader also includes a linkage arrangement movably connecting the housing containing the rotor to the agricultural machine for allowing the housing and rotor to be moved between at least one position in relation to the harvesting machine for receiving a flow of crop residue from a threshing mechanism of the machine and a flow of crop residue from a cleaning mechanism of the machine through the at least one inlet opening, at least one position for receiving a flow of crop residue from the cleaning mechanism of the harvesting machine through the at least one inlet opening while preventing a flow of crop residue from the threshing mechanism from entering the at least one inlet opening, and at least one position spaced from the cleaning mechanism to allow an operator access thereto through the space. Additionally, a convenient and easy to use locking mechanism is provided allowing the spreader to be securely locked in any of the positions thereof.

DETAILED DESCRIPTION OF THE INVENTION

Figure 1:
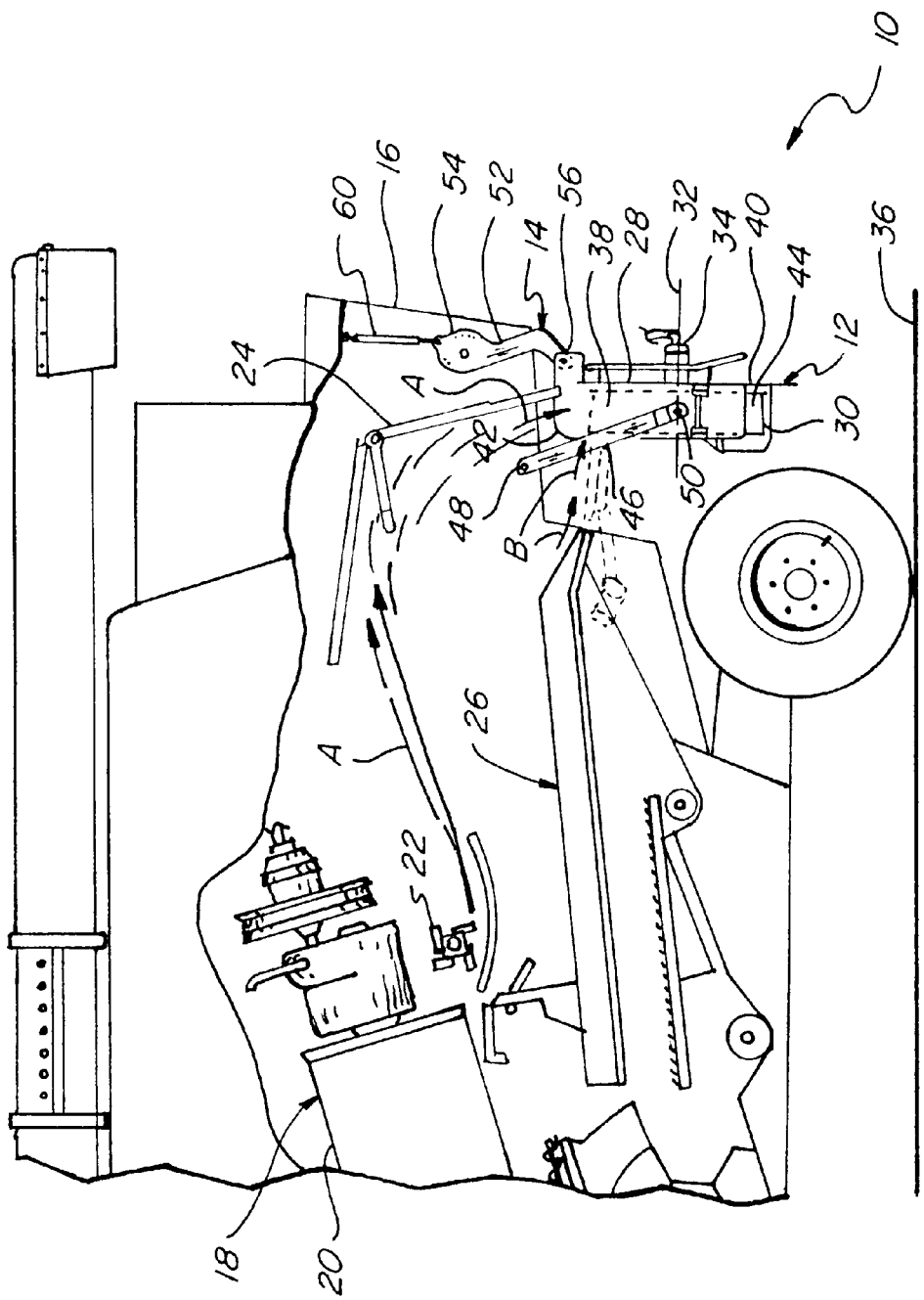
FIG. 1 is a simplified fragmentary side elevational view of an agricultural combine including a crop residue spreader supported by a linkage arrangement allowing movement of the spreader between multiple operating and service positions according to the invention.
Figure 2:
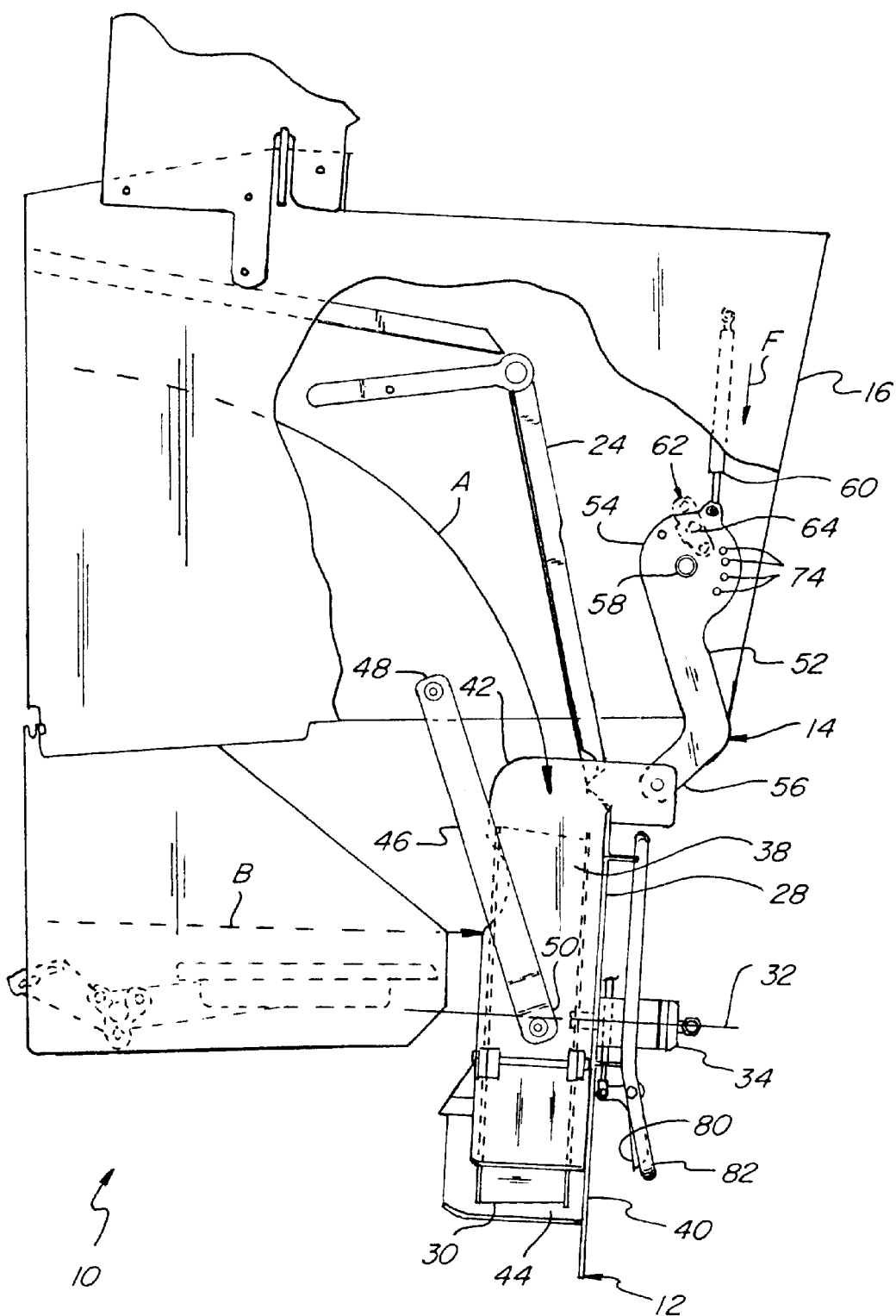
FIG. 2 is an enlarged fragmentary side view of the combine of FIG. 1 showing the spreader and linkage arrangement according to the invention in a first position.
Figure 3:
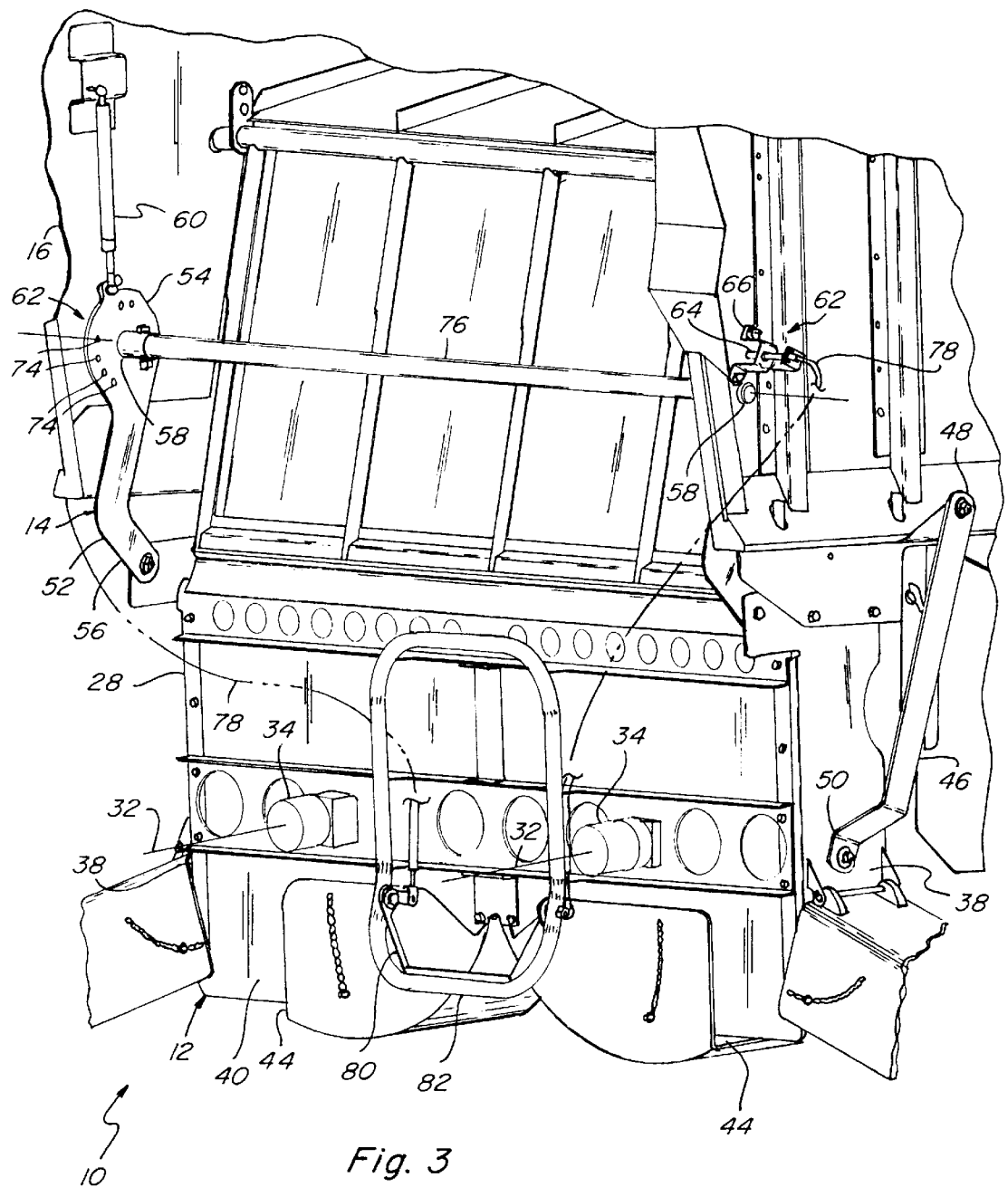
FIG. 3 is a fragmentary perspective view of the combine of FIG. 1 showing additional features of the spreader and linkage arrangement.

Referring now to FIGS. 1, 2 and 3 of the drawings, an agricultural combine 10 representative of a wide variety of agricultural harvesting machines is shown. Combine 10 includes a crop residue spreader 12 supported by a linkage arrangement 14 constructed and operable according to the present invention for allowing movement of spreader 12 between multiple operating and service positions in relation to a rear end 16 of combine 10 as will be explained. Combine 10 is constructed and operable in the well known manner and includes a threshing mechanism 18 including a rotor 20 rotatable for separating straw stalks and other plant residue from the harvested crop, and a beater 22 rotatable for propelling or directing the flow of straw and other residue rearwardly along the airborne trajectory or flow path A, as is also well known in the art. The vertical or near vertical downward terminal end of the trajectory or flow path A is partly the result of gravity and also deflection of the flow by a deflector 24 located upstream and above spreader 12, and is optionally adjustable by moving or changing the angle of deflector 24. Combine 10 includes cleaning apparatus 26 for receiving the harvested crop from threshing mechanism 18 and removing chaff and any other remaining additional residue including seed pods and husks and the like from the grain and directing a flow of the chaff and additional residue rearwardly, as indicated by arrows B. Spreader 12 includes a housing 28 of sheet metal or other construction at least partially containing a pair of disks or rotors 30 rotatable in counter-rotating directions about rotational axes 32 by suitable driving elements, respectively, such as by conventionally constructed and operable hydraulic motors 34 powered by pressurized hydraulic fluid received from a pump (not shown) of combine 10, an electric motor, belt, or the like. With spreader 12 in the position shown, which may be considered the normal operating position, rotational axes 32 are generally horizontal or oriented at only a small acute angle to horizontal, which is generally parallel to the ground, denoted at 36 in FIG. 1. Housing 28 includes opposing radial outer side walls 38, and a rear wall 40, defining a cavity (not shown) containing rotor 30, as well as at least one forwardly and upwardly facing inlet opening 42 for receiving a desired portion of the residue flows A and B, and a pair of downwardly and radially facing discharge openings 44 through which the residue is propelled by respective rotors 30.

As noted above, spreader 12 is supported in the position shown by linkage arrangement 14. Linkage arrangement 14 preferably includes two substantially identical four bar arrangements located on opposite sides of spreader 12, each including a main support arm 46 pivotally connected at one end 48 thereof to the side of combine 10 and at the opposite end 50 to one of the side walls 38 of spreader 12. The four bar arrangements each additionally include a control arm 52 having one end 54 pivotally connected to combine 10 using a bolt or other suitable connecting elements, and an opposite end 56 pivotally connected to spreader 12, the third and fourth bars of each arrangement comprising the structure of combine 10 between the connections of ends 48 and 54 thereto and the structure of spreader 12 between the connection of ends 50 and 56 thereto. End 54 of control arm 52 is pivotable about a center 58, and a gas spring 60 is pivotally connected between end 54 of each control arm 52 and combine 10 in position for exerting a yieldable biasing force as denoted by arrow F in FIG. 2 against the respective control arm about one side or the other of center 58. Here, the force F is shown exerting its force F against arm 52 about the rearward side of center 58, which has the result of urging spreader forwardly for holding it in the position shown.

Figure 4:
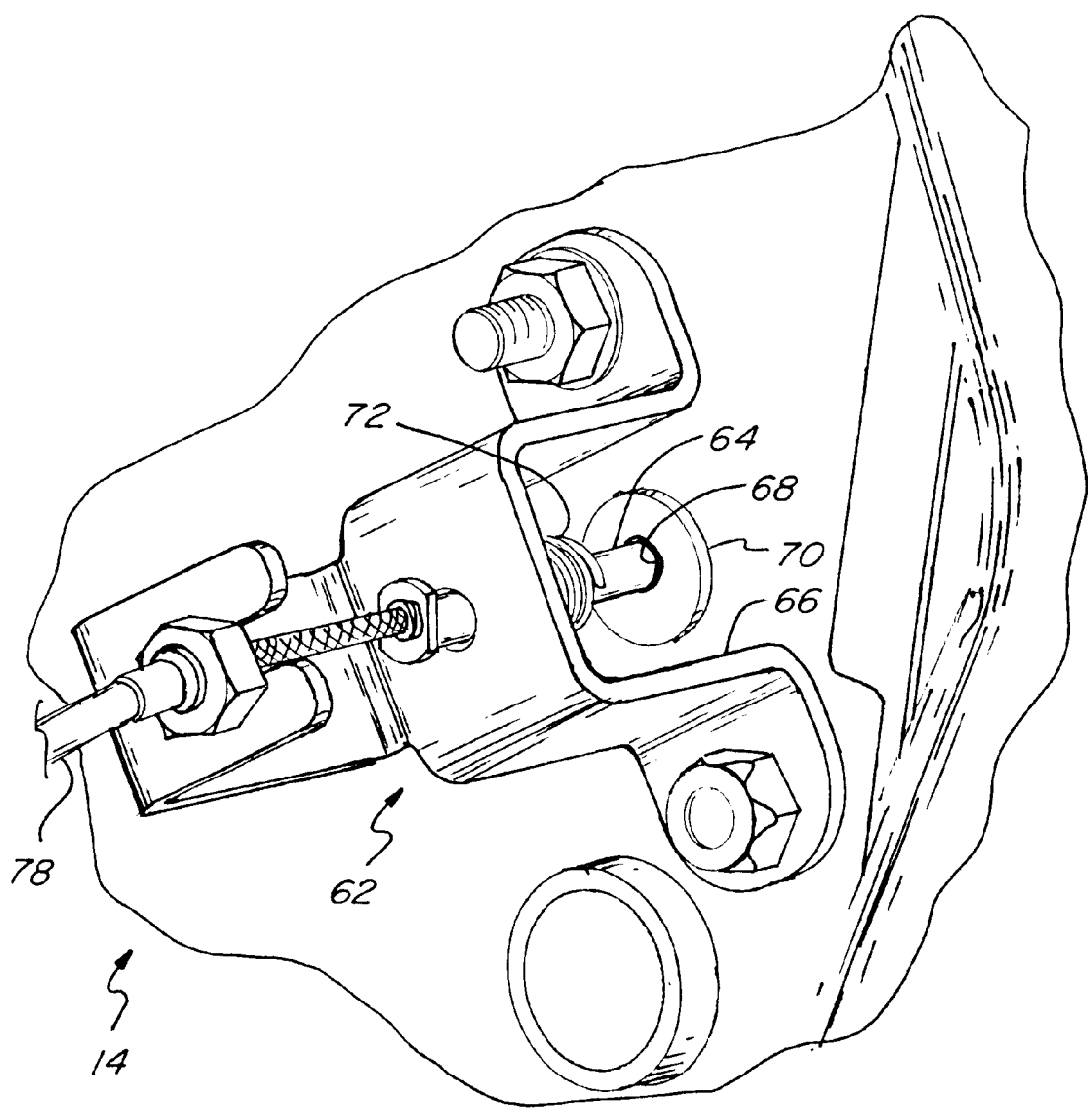
FIG. 4 is an enlarged fragmentary perspective view showing components of a locking mechanism of the linkage arrangement of FIG. 1.

Referring also to FIG. 4, linkage arrangement 14 includes locking mechanisms 62 lockable for holding each control arm 52 and thus spreader 12 in a selectable desired position such as shown, each mechanism 62 including a pin 64 positioned and held by a bracket 66 on a side surface of combine 10 through a hole 68 in a bushing 70 through the side surface, pin 64 being biased axially toward bushing 70 by a spring 72 so as to be alignable with and cooperatively receivable in a selected one of a plurality of holes 74 in end 54 of control arm 52 located on the opposite side of the side surface for holding arm 52 and thus spreader 12 in the selected position. To allow pins 64 to be simultaneously aligned and received in selected holes 74 of arms 52, arms 52 are connected together so as to be jointly pivotable by a crossbar 76. Also, pins 64 are each connected to the inner cable of a control cable assembly 78 which inner cable, in turn, is connected to a release bar 80 mounted for pivotal movement to rear wall 40 of spreader 12, release bar 80 being movable for simultaneously pulling the inner cable to pull pins 64 from holes 74 to release arms 52 and thus spreader 12 from a particular position and allow it to be moved to another position.

Referring more particularly to FIGS. 1 and 2, in the position shown, spreader 12 is positioned with rotational axis 32 substantially horizontal or at a small acute angle to horizontal, with inlet opening 42 positioned for receiving residue flows A and B simultaneously, rotors 30 being rotatable for increasing the velocity of and mixing flows A and B and discharging them through discharge openings 34 onto a field on which combine 10 is harvesting plants from, spreader 12 being held and maintained in this position by the receipt of pins 64 and appropriately positioned holes 74 in arms 52. With spreader 12 in this position, the mixture of residue propelled from discharge openings 44 will be spread substantially evenly over the field to a width of a desired extent rearwardly of combine 10.

Figure 5:
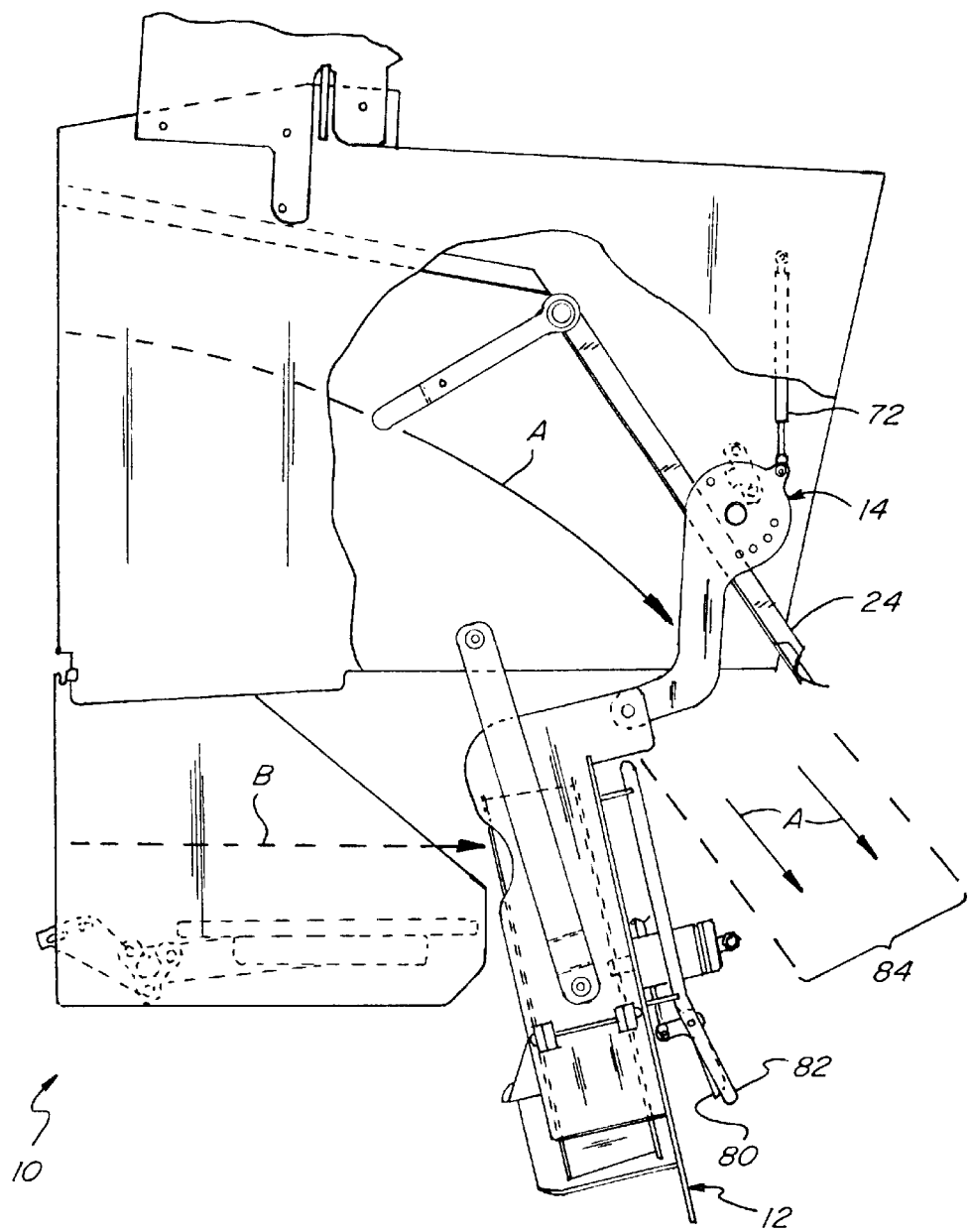
FIG. 5 is another enlarged fragmentary side view of the combine of FIG. 1 showing the linkage arrangement supporting the spreader in a second position.

Referring also to FIG. 5, in some instances, a farmer will desire to spread the chaff and other residue represented by flow B using spreader 12, but allow the flow of straw and other plant residue denoted by arrows A to bypass spreader 12 and be deposited in a narrower windrow directed behind combine 10. Linkage arrangement 14 allows spreader 12 to be moved to at least one alternative position such as shown in FIG. 5 to allow this practice. To move from the position shown in FIGS. 1–3 to the position shown in FIG. 5, release bar 80 is squeezed toward a handle 82 to pull pins 64 from the previously selected holes 74, which allows an operator to grasp handle 82 located beneath release bar 80 with the same hand and pull handle 82 to tip the top end of spreader 12 forwardly with gas spring 60 to the position shown in FIG. 5, release bar 80 being releasable to allow pins 64 to enter appropriately positioned holes 74 in the respective control arm 52 for holding control arm 52 and thus spreader 12 in the selected position. Importantly, with spreader 12 in this position, the chaff residue flow B can still enter the spreader in the above described manner. But, deflector 24 can be moved and locked in a position such as that shown in FIG. 5 to provide a bypass space 84 above and rearwardly of spreader 12 for flow A to bypass the spreader so as to land in a relatively narrow windrow behind combine 10.

Figure 6:
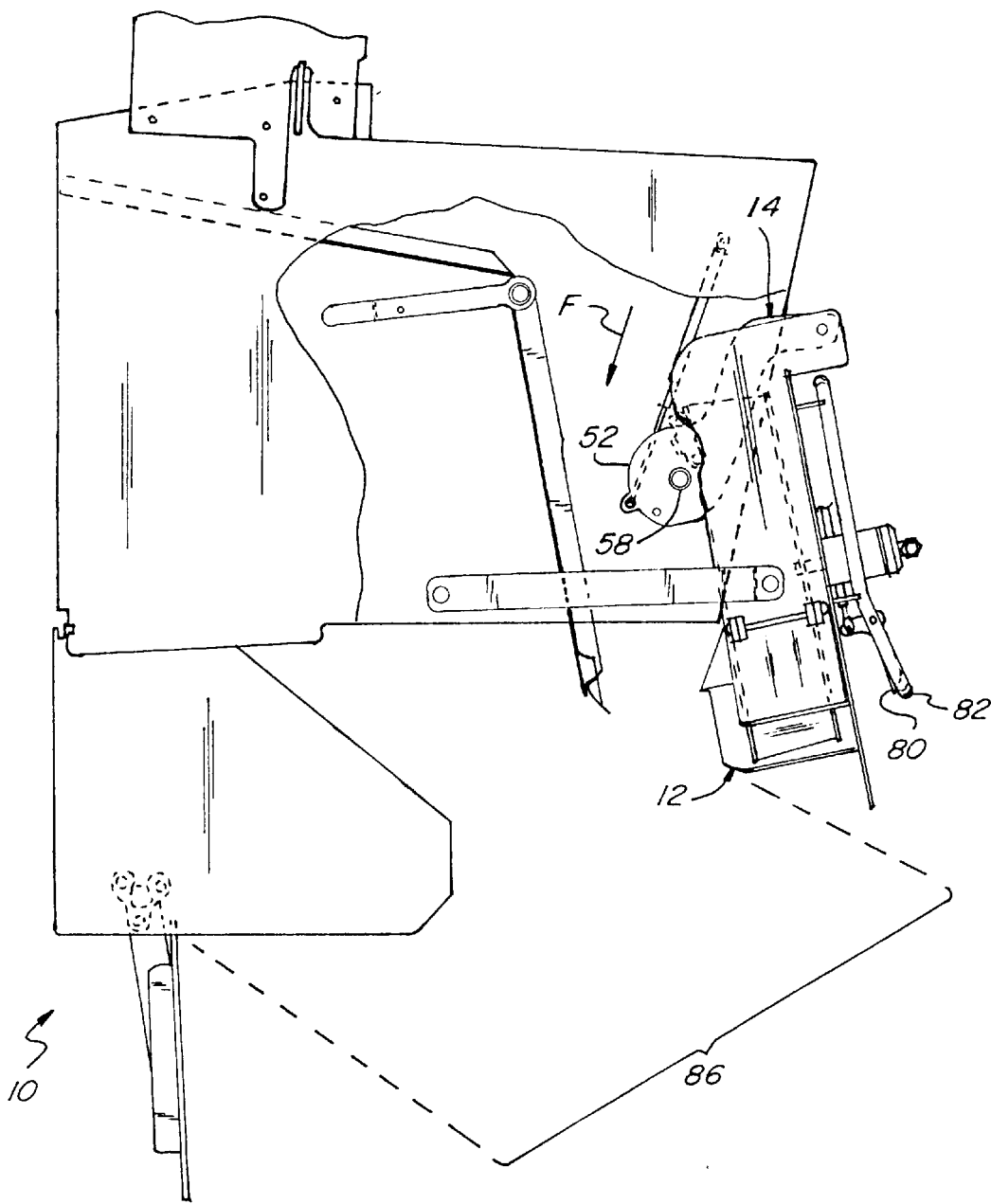
FIG. 6 is another enlarged fragmentary side view of the combine of FIG. 1 showing the linkage arrangement supporting the spreader in a third or service position.

Also referring to FIG. 6, by pulling release bar 80 to pull pins 64, and lifting handle 82, spreader 12 can be lifted upwardly and rearwardly, thereby rotating arm 52 about center 58 in opposition to force F, such that force F is moved over center 58 so as to now act on the front side of center 58 so as to urge spreader 12 in the upward and rearward direction. Spreader 12 can now be easily lifted and moved rearwardly to any of several raised positions such as the position shown, while being maintained in the same general orientation relative to horizontal as before, to open a large space, denoted at 86, between cleaning apparatus 26 and spreader 12 to allow an operator or service person easy and convenient access to the cleaning apparatus, and also the rear portions of the threshing mechanism (also not shown) and other items in the rear of the combine. When spreader 12 is positioned as desired, release bar 80 is released to allow pins 64 to enter appropriately positioned holes 74 to hold spreader 12 in the selected position. Here, it should be noted that there are numerous holes 74 in control arms 52 at appropriate locations, as best shown in FIGS. 2 and 3, to allow positioning spreader 12 in a variety of positions, as desired. It should also be noted that when spreader 12 is positioned as shown in FIG. 6, or the other similar alternative positions, combine 10 can be operated to direct all residue rearwardly and outwardly onto the ground behind combine 10, if desired. Space 86 can be as much as several feet in width front to rear and high enough to afford a person easy access to cleaning apparatus 26 without having to crawl on the ground or stoop or bend over significantly.

Here, it should be noted that the linkage arrangement 14 shown is not limited to use with the spreader 12 shown but could be used with a wide variety of other spreader constructions including one or more rotors or other operative members, and other housing configurations, including devices that chop or cut the plant and crop residue as it passes through. Additionally, although linkage arrangement 14 is shown including a locking mechanism 62 including a release bar 80 and lifting handle 82 at a rearward location, other locking devices could alternatively be used and located elsewhere, as desired. Still further, although an important advantage afforded by linkage arrangement 14 is the ability to easily move spreader 12 manually throughout a wide range of positions, is should be understood that linkage arrangement 14 could alternatively be provided with power assist such as, but not limited to, one or more fluid cylinders attached thereto to allow automatic operation, if desired.

It will be understood that changes in the details, materials, steps, and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

What is claimed is:

1. A crop residue spreader for an agricultural harvesting machine, comprising:
   a housing at least partially containing a rotor rotatable about a rotational axis, the housing including at least one inlet opening for receiving a flow of crop residue from the harvesting machine and a discharge opening through which the flow will be propelled by the rotor when rotated; and
   a linkage arrangement movably connecting the housing containing the rotor to the agricultural machine for allowing the housing and rotor to be moved between a first position in relation to the harvesting machine for receiving a flow of crop residue from a threshing mechanism of the machine and a flow of crop residue from a cleaning mechanism of the machine through the at least one inlet opening, a second position for receiving a flow of crop residue from the cleaning mechanism of the harvesting machine through the at least one inlet opening while preventing a flow of crop residue from the threshing mechanism from entering the at least one inlet opening, and a third position spaced from the cleaning mechanism to allow an operator access thereto through the space.

2. The crop residue spreader of claim 1, wherein when in the first position, the housing is oriented such that the rotational axis is substantially vertical, and wherein when the housing is in the second and third positions, the axis is oriented at a small acute angle relative to horizontal.

3. The crop residue spreader of claim 1, further comprising a locking mechanism for releasably holding the housing in the first, second and third positions, respectively.

4. The crop residue spreader of claim 3, wherein the locking mechanism includes a release lever located adjacent to the housing.

5. The crop residue spreader of claim 1, wherein the linkage arrangement is a four bar linkage arrangement.

6. The crop residue spreader of claim 1, wherein the housing when in the second position is positioned to allow crop residue from the threshing mechanism to flow over the housing.

7. The crop residue spreader of claim 1 wherein when in the first position the housing is located a first predetermined distance from the cleaning mechanism in a first predetermined orientation relative to horizontal and when in the second position the housing is located at about the first predetermined distance from the cleaning apparatus but in a second orientation relative to horizontal different from the first orientation.

8. The crop residue spreader of claim 1 further comprising a biasing element connected to the linkage arrangement operable for urging the spreader toward at least one of the positions.

9. A crop residue spreader for an agricultural harvesting machine, comprising:
   a housing at least partially containing a rotor rotatable about a rotational axis extending through the housing, the housing including an inlet opening for receiving a flow of crop residue from the harvesting machine and a discharge opening through which the flow will be propelled by the rotor when rotated; and
   a linkage arrangement movably connecting the housing containing the rotor to the agricultural machine for allowing the housing and rotor to be moved between at least one position in relation to the harvesting machine for simultaneously receiving a flow of crop residue from a threshing mechanism of the machine and a flow of crop residue from a cleaning mechanism of the machine through the inlet opening, at least one position for receiving a flow of crop residue from the cleaning mechanism of the harvesting machine through the inlet opening while allowing a flow of crop residue from the threshing mechanism to bypass the inlet opening, and at least one position a predetermined distance from the cleaning mechanism defining a space therebetween to allow an operator to access the cleaning mechanism through the space.

10. The crop residue spreader of claim 9, wherein when the spreader is in the at least one position in relation to the harvesting machine for simultaneously receiving the flow of crop residue from the threshing mechanism and the flow of crop residue from the cleaning mechanism, the housing is oriented such that the rotational axis is substantially vertical.

11. The crop residue spreader of claim 9, further comprising a locking mechanism for releasably holding the housing in the positions, respectively.

12. The crop residue spreader of claim 11, wherein the locking mechanism includes a release lever located adjacent to the housing and operable for releasing the housing from the positions.

13. The crop residue spreader of claim 9, wherein the linkage arrangement is a four bar linkage arrangement including arms connected between the housing and the harvesting machine allowing the spreader to be moved along a generally arcuate path between the positions with the rotational axis maintained generally horizontally.

14. The crop residue spreader of claim 13, wherein the linkage arrangement further comprises a gas spring for urging the spreader toward the positions.

15. An agricultural combine, comprising:
   a threshing mechanism for separating crops from plants harvested by the combine, including apparatus for driving a flow of straw and plant residue along a predetermined path;
   a cleaning mechanism for receiving the crops from the threshing mechanism and removing grain from remaining chaff of the crops and discharging a flow of the chaff along a predetermined path; and
   a residue spreader including a housing having at least one inlet opening, at least one discharge opening generally opposite the at least one inlet opening, and a rotor rotatable in proximity to the inlet and discharge openings such that straw and other residue entering the housing through the at least one inlet opening will be propelled by the rotor through the at least one discharge opening, and a linkage arrangement movably connecting the spreader to the combine and supporting the spreader, the linkage arrangement being pivotable relative to the combine to allow the spreader to be moved between at least one position in relation to the combine for simultaneously receiving the flow of straw and plant residue from the threshing mechanism and the flow of chaff from the cleaning mechanism through the at least one inlet opening, at least one position for receiving the flow of chaff from the cleaning mechanism of the harvesting machine through the at least one inlet opening while allowing the flow of straw and plant residue from the threshing mechanism to bypass the spreader, and at least one position a predetermined distance from the cleaning mechanism defining a space therebetween to allow an operator to access the cleaning mechanism through the space.

* * * * *